United States Patent
Lee

(10) Patent No.: US 7,086,585 B2
(45) Date of Patent: Aug. 8, 2006

(54) MEDIA DISPENSER APPARATUS

(75) Inventor: Byung-Mok Lee, Suwon (KR)

(73) Assignee: LG N-Sys Inc., Seoul (KR)

( * ) Notice: Subject to any disclaimer, the term of this patent is extended or adjusted under 35 U.S.C. 154(b) by 572 days.

(21) Appl. No.: 10/327,875

(22) Filed: Dec. 26, 2002

(65) Prior Publication Data

US 2003/0121971 A1     Jul. 3, 2003

(30) Foreign Application Priority Data

Dec. 29, 2001   (KR) ...................... 10-2001-0088547

(51) Int. Cl.
  *G06F 17/60* (2006.01)
(52) U.S. Cl. .................... 235/379; 705/43; 902/9; 902/12; 902/14
(58) Field of Classification Search ................ 235/379; 902/8, 9, 13, 31; 705/43
See application file for complete search history.

(56) References Cited

U.S. PATENT DOCUMENTS

| 4,393,788 | A | * | 7/1983 | Campbell et al. .............. 109/2 |
| 4,540,106 | A | * | 9/1985 | Fukatsu ........................ 221/13 |
| 4,557,072 | A | * | 12/1985 | Rittmeister et al. ............ 49/27 |
| 5,454,332 | A | * | 10/1995 | Fennelly et al. .............. 109/19 |
| 6,502,746 | B1 | * | 1/2003 | Do et al. ..................... 235/379 |
| 2003/0111478 | A1 | * | 6/2003 | Park ............................ 221/21 |

FOREIGN PATENT DOCUMENTS

EP          0981116 A2  *  2/2003

* cited by examiner

*Primary Examiner*—Thien M. Le
*Assistant Examiner*—Edwyn Labaze
(74) *Attorney, Agent, or Firm*—Birch, Stewart, Kolasch & Birch, LLP

(57) ABSTRACT

A media dispenser comprises: a casing separatably installed on a mounting portion of a media dispenser having an eject hole through which media is ejected, and including a media receipt portion on which the media ejected from the eject hole is mounted and an opening portion through which the media on the media receipt portion can be withdrawn by a user; a door for opening/closing the opening portion by a door moving device; and a media guiding portion installed on the eject hole for guiding the media to be ejected on the media receipt portion as facing the opening portion.

18 Claims, 8 Drawing Sheets

MEDIA DISPENSER APPARATUS

BACKGROUND OF THE INVENTION

1. Field of the Invention

The present invention relates to a media dispenser apparatus.

2. Description of the Background Art

Generally, an automatic teller machine (ATM) or a cash dispenser (CD) is installed on an area such as a bank, a convenient store and subway station, etc. where many people passes by, to withdraw cash by simple operations of a user.

The user inputs a card/bankbook into an inlet (in some cases, the user uses an operation plate or inputs required information using a portable communication device such as a mobile phone), and proceeds desired procedure as operating buttons according to guidance displayed on a display device mounted on a front surface of the ATM, then, media such as the cash or check, and specification are withdrawn from the ATM according to results of the procedure. The specification is withdrawn through a specification outlet, and the media is provided through a media dispenser module, that is, a customer access module disposed on the front surface of the ATM.

However, in the conventional media dispenser apparatus, arrangement angle of the media which is conveyed to the media dispenser module and mounted on a media receipt portion is horizontal when it is seen from front side, and therefore, it is difficult for the user to see the withdrawn media, and also, the withdrawn media becomes stood status by outer air, there may be a lot of cashes which are not withdrawn by the user in the apparatus. Therefore, the media dispenser apparatus is likely to be operated wrongly, and a manager should remove the remained media and re-operate the media dispenser apparatus.

SUMMARY OF THE INVENTION

Therefore, an object of the present invention is to provide a media dispenser apparatus by which a probability of non-receipt media by a user can be reduced, and a remained cash is removed automatically to re-operate the apparatus when the remained cash is generated.

To achieve the object of the present invention, as embodied and broadly described herein, there is provided a media dispenser apparatus according to the present invention comprising: a casing including a media receipt portion, on which a media discharged from an eject hole is mounted, installed separatably on a mounting portion of a media ejecting device, on which the eject hole for ejecting the media is installed, and including an opening portion for withdrawing the media received on the media receipt portion; a door for opening/closing the opening portion by a door moving device; a media guiding portion installed on the eject hole for guiding the media to be ejected on the media receipt portion as facing the opening portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
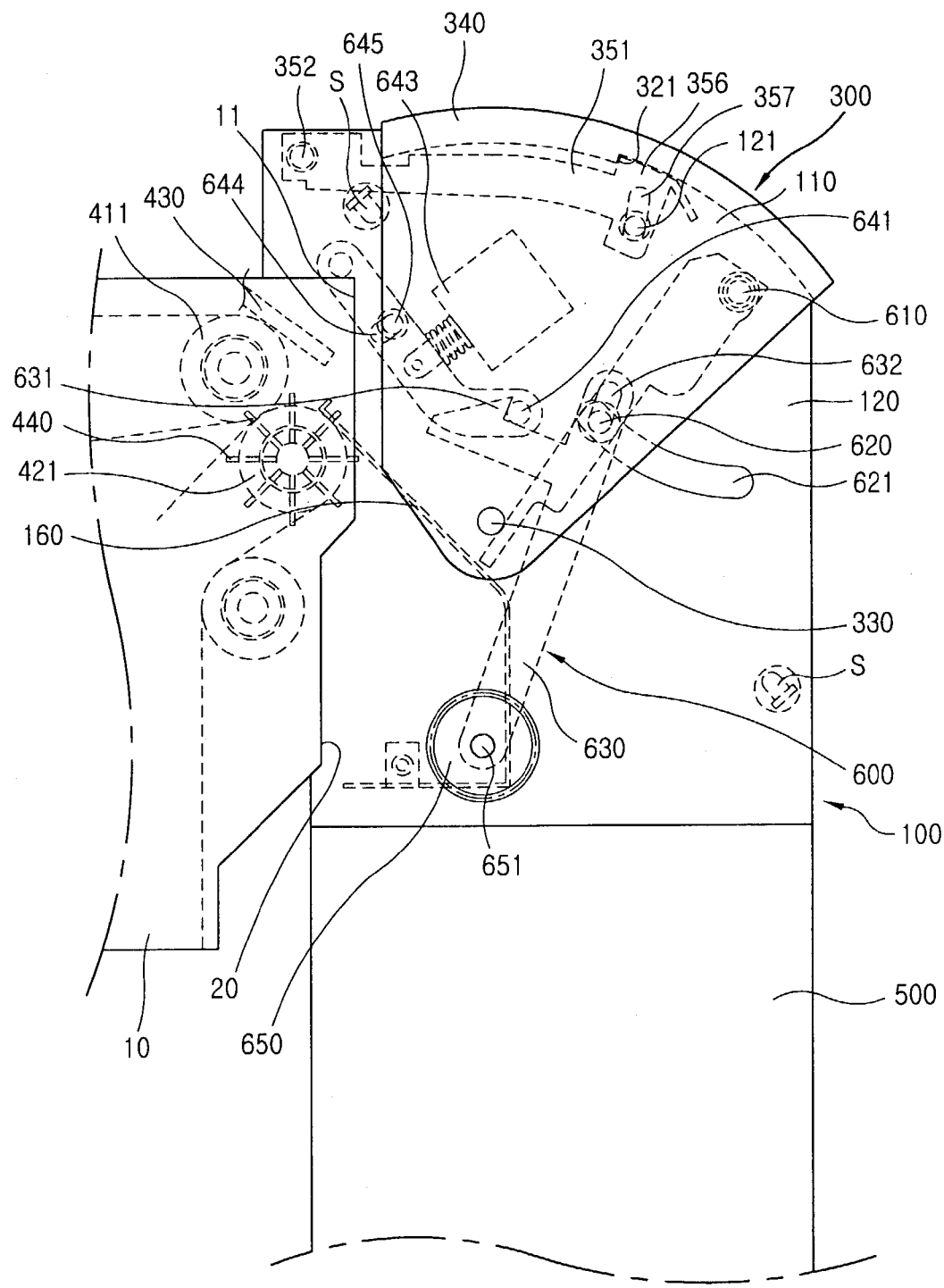
FIG. 1 is a left side view showing a structure of a media dispenser apparatus according to the present invention.
Figure 2:
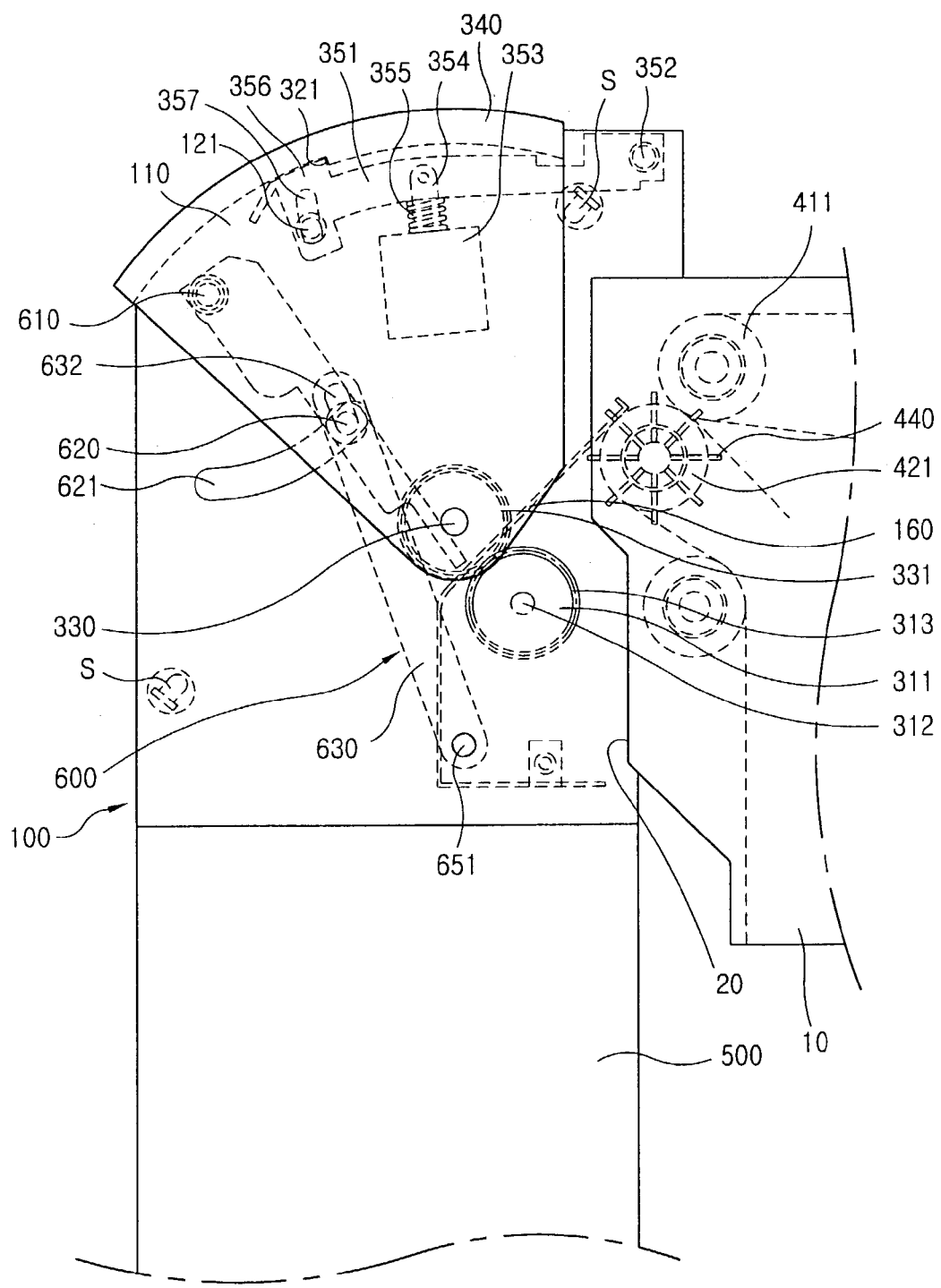
FIG. 2 is a right side view showing the apparatus in FIG. 1.

As shown in FIGS. 1 and 2, a media dispenser apparatus according to the present invention comprises: a casing 100 installed throughout from a media cassette (not shown) on which media is carried, to an eject hole 11 of a conveyer (not shown) carrying the media to have an inner space, and including an opening portion 110 on upper front side (the direction represented by an arrow in FIG. 1); a door 300 for opening/closing the opening portion 110 by a door moving device 310; a media receipt portion 200, on which the media ejected from the eject hole 11 is received, installed in the casing 10; and a media guiding portion 400 installed on the eject hole 11 for guiding the media to be ejected on the media receipt portion 200 toward the opening 110, that is, toward an upper part of a front surface of the casing.

The casing 100 has a pair of side walls 120, and a guiding plate 160, which is slanted toward one side, is installed between the side walls 120. In addition, the guiding plate 160 is installed as contacted to the media receipt portion 200, and thereby, the guiding plate 160 supports the media when the media is ejected.

The door 300 is formed to be a curved surface larger than the opening portion 110 so as to open/close the opening portion 110 of the casing 100, and comprises a curved surface portion 320 having a suspending portion 321 therein, and a pair of side portions 340 extended from both side ends of the curved surface portion 320 as sectors and coupled to hinge shaft 330 installed on rear part of the casing 100 respectively.

Figure 3:
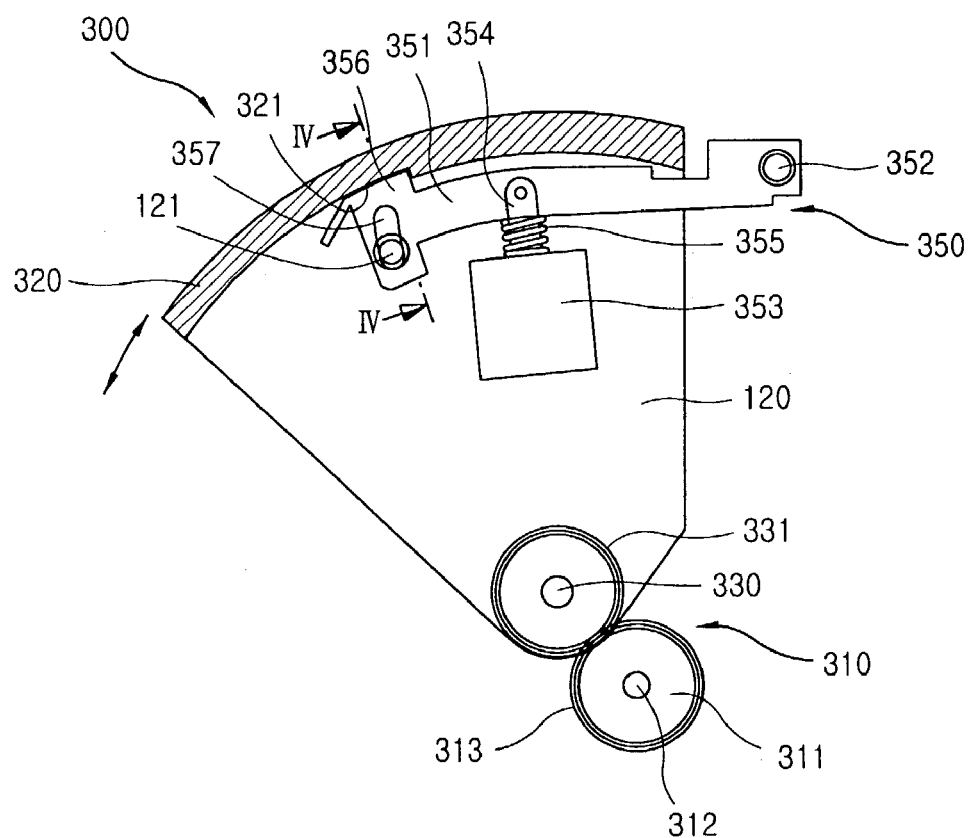
FIG. 3 is a side view showing a door and a locking means of the media dispenser apparatus shown in FIG. 1.
Figure 4:
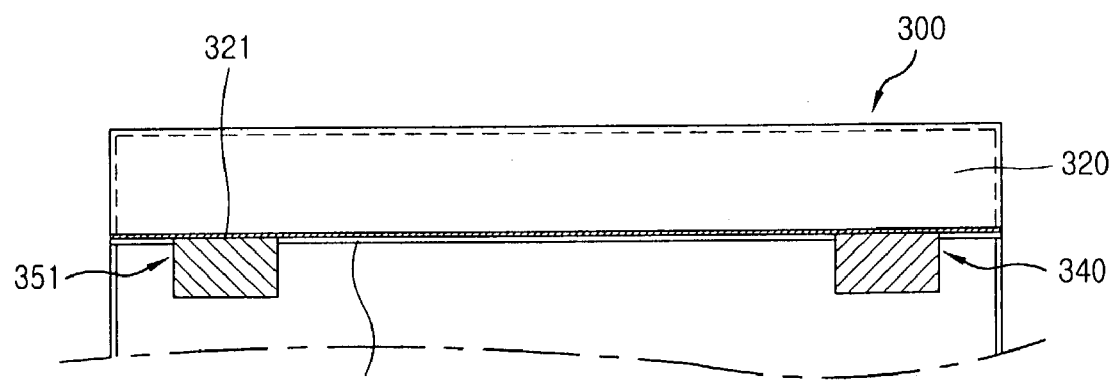
FIG. 4 is a cross-sectional view in line III—III direction in FIG. 2.

As shown in FIG. 3, the door 300 opens the opening portion 110 after moving to a direction of the opening 110 seen by the user, that is, to a lower part on the front surface. In addition, when the door 300 closes the opening portion 110 completely, the door 300 is not opened by being caught on the suspending portions 321 by a locking means 350.

The hinge shafts 330 of the door 300 make a pair, and are fixed on the side walls 120 of the casing 100 taking the media receipt portion 200 therebetween.

The side surface portions 340 are formed as fans, however, a rod rotating centering around the hinge shaft 330 may be used as the side surface portion 340.

The suspending portion 321 of the door 300 maintains the locked status of the door 300 by an interaction with a suspending member 351 of the locking means 350 which will be described later, and can be modified variously with the suspending member 351. The suspending portions 321 in the embodiment of the present invention is formed to be stepped as corresponding to the suspending member 351 on inner surface of the curved surface portion 320, as shown in FIG. 3.

The door moving device 310 comprises: a first driven gear 331 coupled to the hinge shaft 330 of the door 300 between the side surface 120 of the casing 100 and the inner surface of the side surface portion 340 of the door 300, a motor 311 mounted on the side surface 120 of the casing 100, and a first driving gear 313 coupled to a motor shaft 312 of the motor 311 and rotated as engaged with the first driven gear 331.

The locking means 350 comprises: a rotating shaft 352 installed on the casing 100 in transverse direction for the media receipt portion 200, when it is assumed that the closing direction of the door 300 is the length direction; a pair of suspending members 351 coupled to the rotating shaft 352 so as to be rotatable and caught on the suspending portions 321 when the door 300 is closed completely; and a suspending member driving portion 353 fixedly installed on a side portion of the media receipt portion 200 to rotate the suspending members 351 in order to release the locked status of the suspending members 351 when the door 300 is opened.

The rotating shaft 352 is installed on upper part of the media receipt portion 200, which is the end portion on the closing direction of the door 300 when the door 300 is closed. In addition, the suspending member driving portion 353 only can be installed on one side surface of the media receipt portion 200, and in this case, when one of the suspending members 351 is rotated by the suspending member driving portion 353, another suspending member 351 is also rotated together by the rotating shaft 352.

Also, the suspending member driving portion 353 is connected to respective suspending member 351 to be synchronized. In addition, the suspending member driving portion 353 is coupled to a position apart a certain distance from the rotating shaft 352 using a link. And solenoid, etc. can be used as the suspending member driving portion 353 which can be moved linearly.

In addition, an elastic member 355 may be installed so as to elastically support the suspending member 351 toward a shaft 354 of the solenoid, that is, toward the suspending member driving portion 353, in order to make the door 300 go to the position of locked status.

The suspending members 351 have protruded portions 356 formed to be caught by the suspending portions 321 of the door 300, and the protruded portions 356 have guide recesses 357 formed as curved lines centering around the rotating shaft 352. In addition, the guide recesses 357 guide the movements of the suspending members 351 by inserting guide pins 121 which are fixedly installed on the side walls 120 of the casing 100 therein.

As shown in FIGS. 1 and 2, the media receipt portion 200 is installed to be slanted toward lower part from the front part of the casing 100 to the rear part of the casing 100, when it is assumed that the surface of casing 100 seen by the user is the front surface. Especially, it is desirable that the media receipt portion 200 is disposed to make an acute angle with vertical direction of the casing 100 so that the ejected media can be accumulated vertically.

A media guiding portion 400 for conveying the media stored in a media cassette (not shown) and dropping the media onto the media receipt portion 200 through the eject hole 11 is located on rear upper part of the casing 100.

Figure 6:
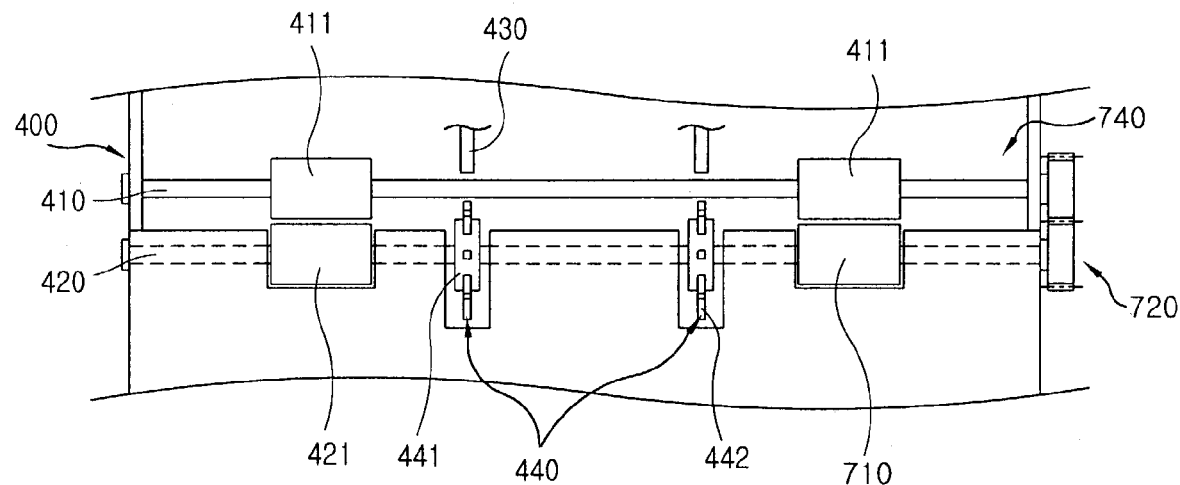
FIG. 6 is a partial block diagram showing a structure of a discharge guide of the media dispenser apparatus shown in FIG. 1.
Figure 7:
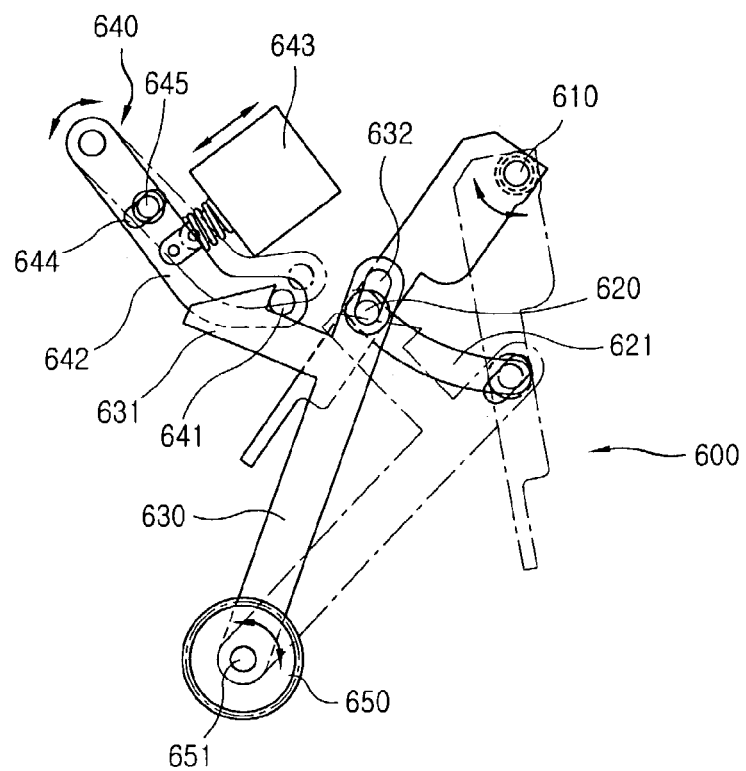
FIG. 7 is a partial block diagram showing a structure of a media receipt portion rotating device shown in FIG. 1.

As shown in FIG. 6, the media guiding portion 400 comprises: a pair of first and second convey rotating shafts 410 and 420 installed on up and down of the eject hole 11 and rotated by a driving device (not shown); one or more pairs of conveying rollers 411 and 421 coupled to the first and second convey rotating shafts 410 and 420 respectively, and engaged with each other to convey the media; and a guide member 430 disposed parallelly with the first and second convey rotating shafts 410 and 420 for pushing rear part in proceeding direction of the media which is ejected by the conveying rollers 411 and 421.

As shown in FIG. 6, the guide member 430 is located on an upper side of the first rotating shaft 410, and pushes the rear part of the media when the media conveyed by the conveying rollers 411 and 421 is escaped from the conveying rollers 411 and 421, in order to make the media ejected as facing upward of the front surface on the casing 100.

In addition, the media guiding portion 400 is fixedly installed on the first or second convey rotating shaft 410 or 420, and a pushing member 440 is additionally installed for pushing the rear part of the media in the proceeding direction of the media by being rotated with the first or second convey rotating shaft 410 or 420.

The pushing member 440 comprises a circular portion 441 fixedly inserted into the first or second convey rotating shaft 410 or 420, and a plurality of protrusions 442 protrusively formed on an outer circumferential surface of the circular portion 441 in radial direction.

In addition, a sensor (S), which is a media sensing unit for detecting whether there is the media on the media receipt portion 200, is mounted on one side of the casing 100 and the media receipt portion 200.

Also, a housing (not shown) having an opening corresponding to the opening portion 110 is installed on the front surface of the casing 100 so as not to expose the locking means 350 to outer side.

On the other hand, as shown therein, the media dispenser 10 according to the present invention further comprises a media receipt portion rotating device 600 which rotates the media receipt portion 200 so that the media on the media receipt portion 200 is dropped into a media collecting chamber 500 coupled to the casing 100 without opening the door 300, in case that the wrong operation happens in the state that the media is on the media receipt portion 200.

Both ends of the media receipt portion 200 are installed on both side walls 120 of the casing 100 when it is assumed that the surface of the casing 100 seen by the user is the front surface, so that the both ends can be rotated centering around a first rotary shaft 610.

A pair of guide pins 620 are installed on both end portions of the media receipt portion 200 with a certain gap from the first rotary shaft 610. The guide pins 620 are inserted into guide slots 621 formed on the side walls of the casing 100 to guide the rotation of the media receipt portion 200 caused by the media receipt portion rotating device 600.

The media receipt portion rotating device 600 comprises a driving motor 650 installed on one of the side walls 120 of the casing 100, a second rotary shaft 651 rotated by the driving motor 650, a link member 630 connectedly installed on the second rotary shaft 651 and having an auxiliary slot 631 into which the guide pin 620 is inserted, and a rotation limiting device 640 for selectively limiting the lo rotation of the link member 630.

The rotation limiting device 640 comprises a suspending hook 631 extendedly formed on the end of the link member 630, a rotating arm 642 rotatably installed on the side wall 120 of the casing and having a suspending pin 641, to which the suspending hook is hooked, fixed on a free end, and an actuator 643 for releasing the fixation of the suspending pin 641 from the,suspending hook 631 by rotating the rotating arm 642.

The solenoid is used as the actuator 643, and fixedly installed on the rotating arm 642. In addition, a slot 645 is formed on the rotating arm 642 so as to guide the rotating arm 642 by inserting the pin 644 fixedly installed on the side wall 120 therein.

Hereinafter, operations of the media dispenser according to the present invention will be described as follows.

To begin with, the user puts a card/bankbook and inputs required information through an input device (not shown). Especially, the user is able to input the required information through the input device without the card/bankbook, or to input the information through a portable communicating apparatus, etc.

The media dispenser 10 conveys the media required by the user from the media cassette to the media receipt portion 200 through a conveying device (not shown) according to the requirement of the user.

That is, the media required by the user is conveyed by the conveying device through the eject hole 11 of the conveying device, and dropped and accumulated on the media receipt portion 200.

When all of the media such as the cashes or checks required by the user are supplied to the media receipt portion 200, the suspending member 351 of the locking means 350 releases the locked status with the suspending portion 321 of the door 300. And the door 300 rotates downward centering around the hinge shaft 330 by the operation of the first driven gear 331 and of the motor 311 to open the opening portion 110, and then, the user withdraws the media accumulated on the media receipt portion 200 through the opening portion 110. After that, the door 300 rotates upward by the reverse operations of the motor 311 and the first driven gear 331 to close the opening portion 110.

On the other hand, the locking operation of the door 300 and the releasing operation in the state that the door 300 closes the opening portion 110 of the casing 100 will be described as follows.

Figure 5:
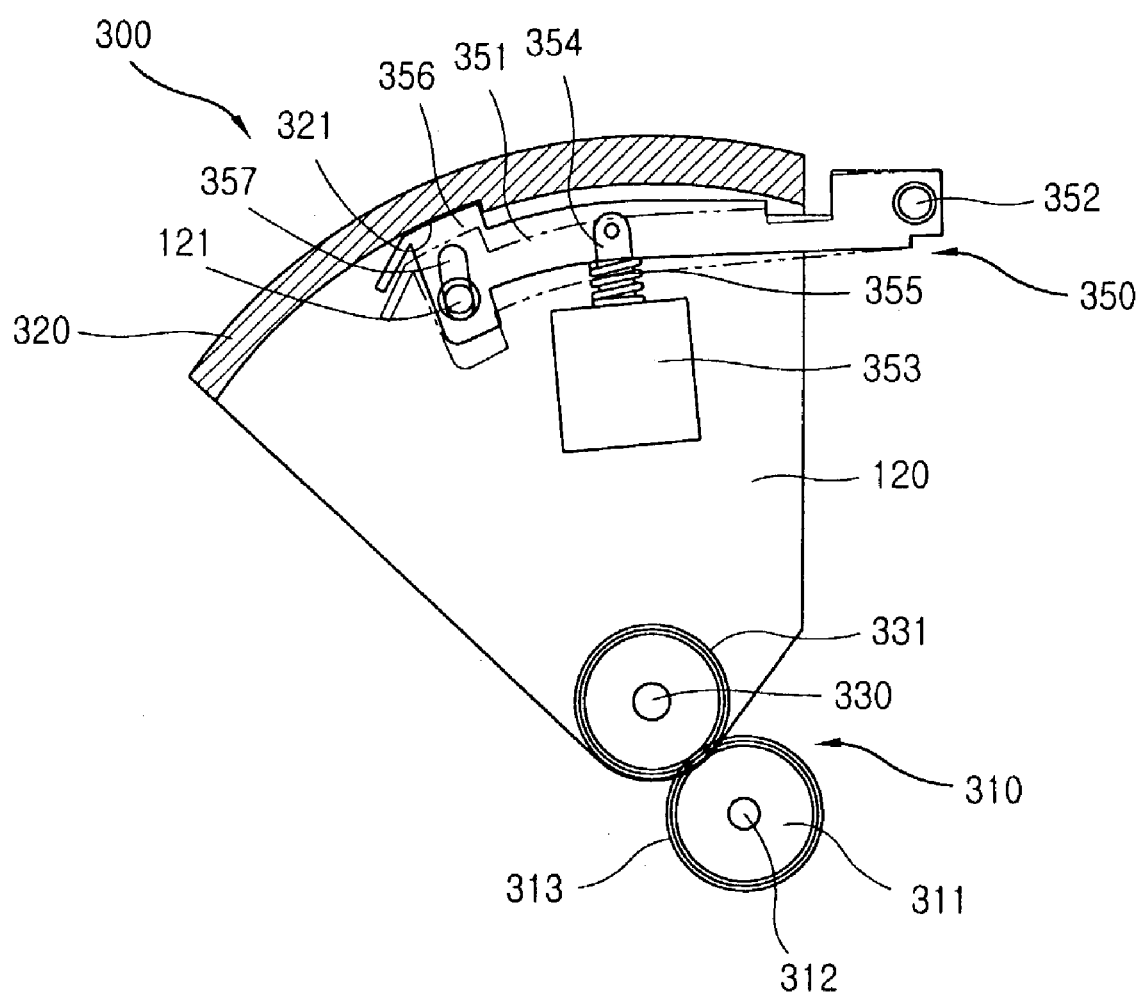
FIG. 5 is a side view showing operational status of the locking means in FIG. 3.

First, as shown in FIG. 5, the suspending member driving portion 353 is not operated in the state that the door 300 closes the opening portion 110 of the casing 100, and the pair of suspending members 351 are elastically supported by the elastic member 355. Thereby, the protruded portions 356 are matched to the suspending portions 321 of the door 300 respectively, and therefore, the opening of the door 300 can be prevented. At that time, the guide pins 121 are located on lower part (in Figure) of the guide recess 351, respectively.

In addition, in case that the opening portion 110 of the casing 100 is opened by rotating the door 300, the suspending member driving portion 353 is operated and the shaft of the suspending member driving portion 353 pulls the suspending member 351. Then, the protruded portion 356 is escaped from the suspending portion 321 of the door 300, and at the same time, another suspending member 351 is communicated with the above suspending member 351 by the rotating shaft 352 connected thereto, and thereby, another suspending member 351 is rotated and the protruded portion 356 of another suspending member 351 is escaped from the suspending portion 321 of the door 300.

Accordingly, the protruded portion 356 of the suspending member 351 is released from the suspending portion 321 of the door 300, and the door 300 can be moved. At that time, the guide pins 121 are located on upper part (in Figure) of the guide recess 323.

In addition, when the door closes the opening portion 110 of the casing 100 in the state that the door 300 opens the opening portion 110 of the casing 100, the operation of the suspending member driving portion 353 is stopped. Thereby, the suspending members 351 are pushed by the elastic member 355, and the protruded portions 356 are matched to the suspending portions 321 of the door 300, and thereby, the opening of the door 300 can be prevented.

On the other hand, operational process when the media is ejected through the eject hole 11 will be described as follows.

Figure 8A:
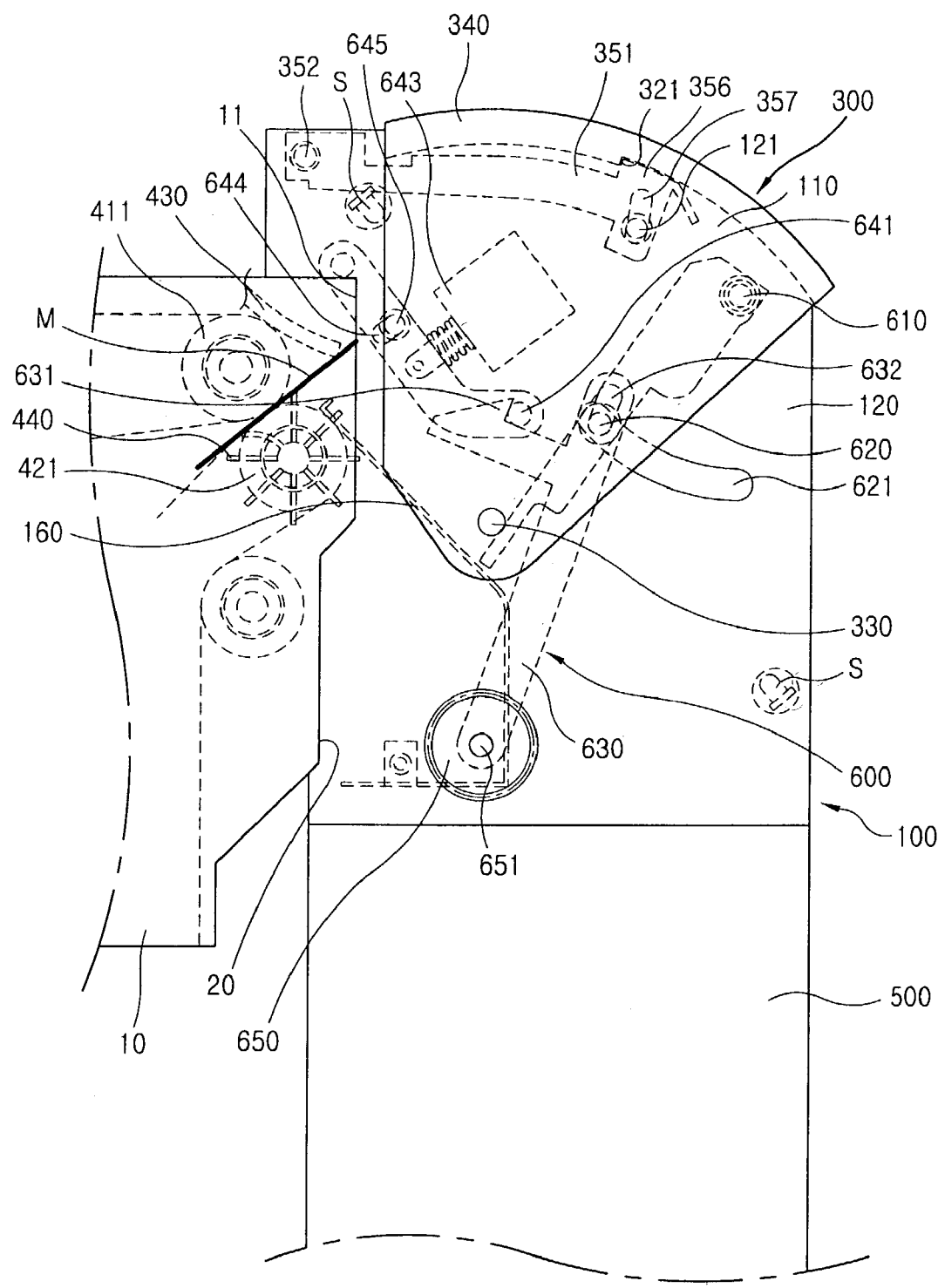
FIGS. 8A, 8B and 8C are conceptual views illustrating processes of dispensing the media by the media dispenser apparatus shown in FIG. 1.
Figure 8B:
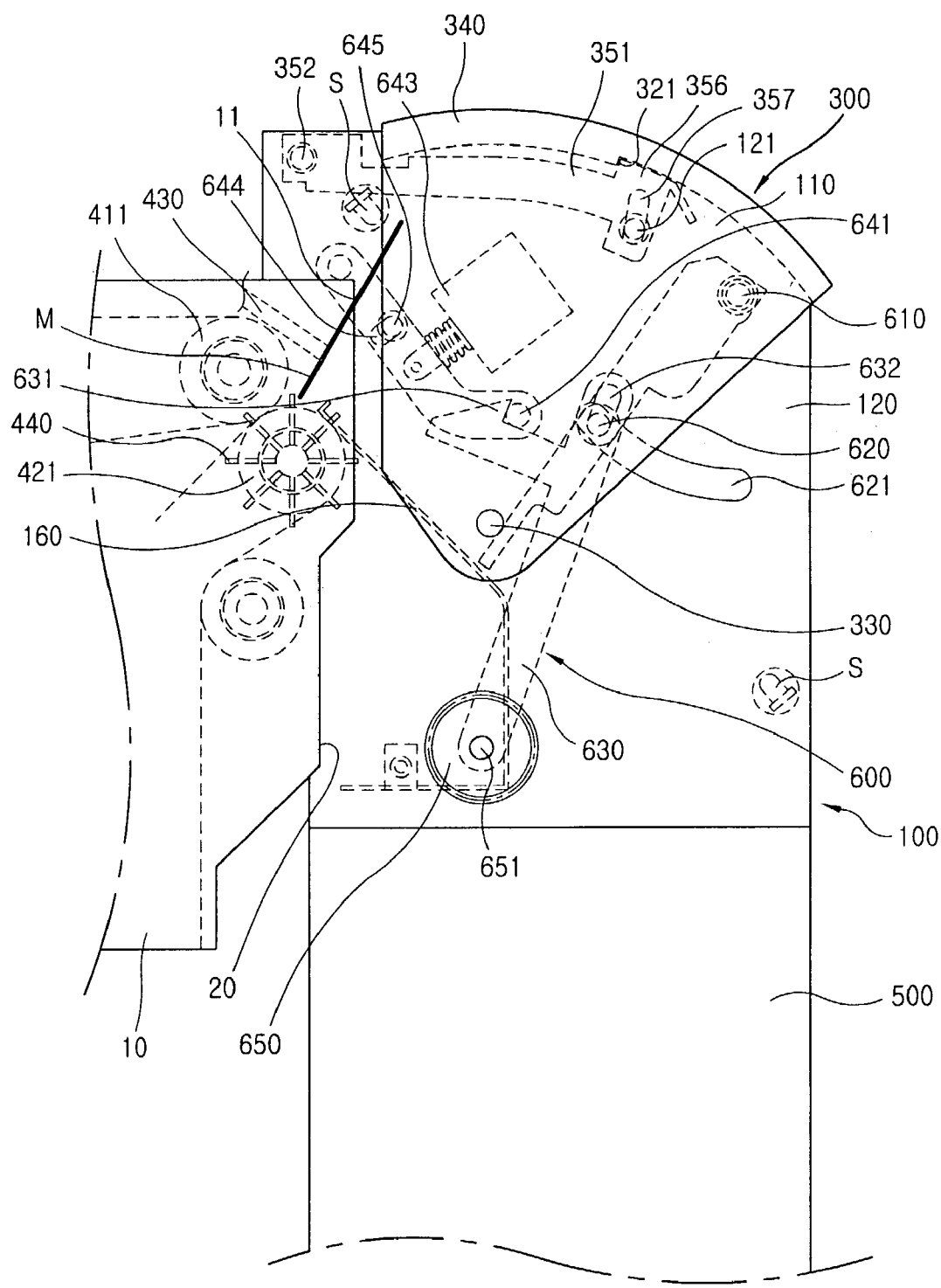
Figure 8C:
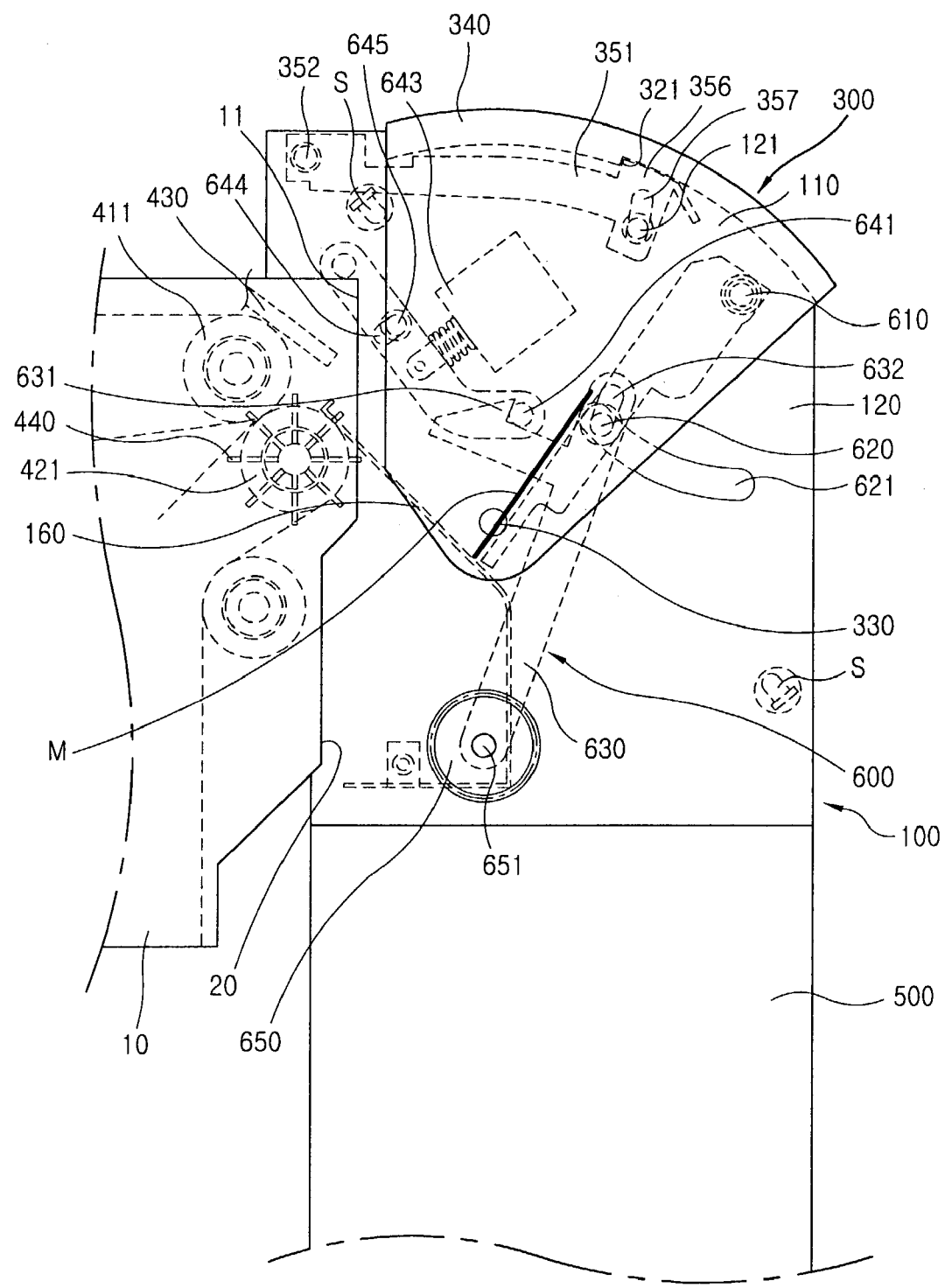

The media conveyed by the conveying device is ejected onto the media receipt portion 200 by the conveying rollers 411 and 412 of the media guiding portion 400 installed on the eject hole 11, as shown in FIGS. 8A, 8B and 8C.

At that time, as shown in FIG. 8A, the media passing through the conveying rollers 411 and 412 is proceeded by the rotation of the conveying rollers 411 and 412 as pushing the guiding member 430 upward.

And as shown in FIG. 8B, the media passing over the conveying rollers 411 and 421 is pushed its rear part by the guiding member 430, and therefore, the front part of the media faces the upper part of the casing 100 relatively. Especially, the pushing member 440 pushes the rear part of the media, and therefore, the media is not dropped directly, but flies to the opening portion 110 of the casing 100, that is, to upper part.

As shown in FIG. 8C, the media passing over the media guiding portion 400 is arranged and accumulated neatly on the media receipt portion 200 which is slanted toward the lower part from the front part to the rear part of the casing 100.

Herein, the media receipt portion 200 is installed to be slanted toward the lower part, from the front surface to the rear surface of the casing 100. Therefore, the cases that the user can not withdraw some media can be reduced.

Also, according to the media dispenser 10 of the present invention, in case that a wrong operation happens in the state that the media is on the media receipt portion 200, the media receipt portion 200 is rotated centering around the first rotary shaft 610 by the operation of the media receipt portion rotating device 600 in the state that the door 300 is not opened, to drop the media on the media receipt portion 200 into the media collecting chamber 500 and the media is returned according to a control signal of a controller (not shown).

Especially, in case that the media is remained on the media receipt portion 200 because the user does not withdraw all the media, the media sensing portion (S) detects whether there is the media on the media receipt portion 200, instead of collecting the media by the manager. If the media is on the media receipt portion 200, the media can be collected by operating the media receipt portion rotating device 600. After that, the media dispenser 10 can be changed into stand-by status for ejecting the media.

As described above, according to the media dispenser of the present invention, the outlet through which the media such as the cash/check, that is, the door for opening/closing the opening portion of the casing can be locked firmly. Also, twisting of the door can be prevented, and thereby, robbery of the cash through the opening portion of the casing by an outer inappropriate user can be prevented in advance. Therefore, the reliability of the apparatus can be improved.

Also, according to the media dispenser of the present invention, the media accumulated on the media receipt portion is arranged nearly in vertical direction, and therefore, it is convenient for the user to withdraw the media. Also, standing of the media by the outer air can be prevented, and thereby the probability that the user does not withdraw some of the media can be prevented and the convenience of using the apparatus can be improved. In addition, the ejecting speed of the media can be increased, and therefore, the time for withdrawing the media can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A media dispenser apparatus comprising:
   a casing separatably installed on a mounting portion of a media dispenser having an eject hole through which media is ejected, and including a media receipt portion on which the media ejected from the eject hole is mounted and an opening portion through which the media on the media receipt portion can be withdrawn by a user;
   a door for opening/closing the opening portion by a door moving device; and
   a media guiding portion installed on the eject hole for guiding the media to be ejected on the media receipt portion as facing the opening portion, wherein the door opens the opening portion by moving downward relative to the opening portion seen by the user as a standard.

2. The apparatus of claim 1, wherein the media receipt portion is installed to be slant toward a lower direction as going from a front surface to a rear surface of the casing, when it is assumed that the direction of casing seen by the user is the front surface.

3. The apparatus of claim 1, wherein the media guiding portion comprises:
   a pair of first and second convey rotating shafts installed on the eject hole and rotated by a driving device;
   one or more pairs of conveying rollers coupled to the first and second convey rotating shafts respectively, and engaged with each other to convey the media; and
   a guiding member disposed to be parallel with the first and second convey rotating shafts and pushing a rear part of the media conveyed through the conveying rollers in proceeding direction.

4. The apparatus of claim 3, wherein the guiding member is a member having elasticity.

5. The apparatus of claim 3, wherein the media guiding portion further comprises a pushing member which is fixedly installed on the first or second convey rotating shaft for pushing the rear part of the media, which is ejected as rotating with the first or second convey rotating shaft, in the proceeding direction of the media.

6. The apparatus of claim 5, wherein the pushing member comprises a circular portion fixedly inserted in the first or second convey rotating shaft, and a plurality of protrusions protrusively formed on an outer circumferential portion of the circular portion in radial direction.

7. The apparatus of claim 1 further comprising a media sensing unit installed on the casing for detecting whether there is the media on the media receipt portion.

8. The apparatus of claim 7 further comprising a media receipt portion rotating device for rotating the media receipt portion so that the media on the media receipt portion can be dropped into a media collecting chamber coupled to the casing without opening the door, in case that a wrong operation happens in the state that the media is on the media receipt portion.

9. The apparatus of claim 8, wherein both ends of the media receipt portion are installed on both side walls of the casing so as to be rotated centering around a first rotary shaft, when it is assumed that the casing seen by the user is the front surface.

10. The apparatus of claim 9, wherein a pair of guide pins are installed on the both ends of the media receipt portion with a certain gap from the first rotary shaft, and the guide pins are inserted into guide slots formed on the side wall of the casing to guide the rotation of the media receipt portion by the media receipt portion rotating device.

11. The apparatus of claim 10, wherein the media receipt portion rotating device comprises: a driving motor installed on of the side walls of the casing; a second rotary shaft rotated by the driving motor; a link member connectedly installed on the second rotary shaft and having an auxiliary slot into which the guide pin is inserted; and a rotation limiting device for selectively limiting the rotation of the link member.

12. The apparatus of claim 11, wherein the rotation limiting device comprises a suspending hook extendedly formed on an end of the link member, a rotating arm rotatably installed on the side wall of the casing and having a suspending pin, on which the suspending hook is hooked, on a free end thereof, and an actuator rotating the rotating arm to release the fixation of the suspending pin on the suspending hook.

13. A media dispenser apparatus comprising:
   a casing separatably installed on a mounting portion of a media dispenser having an eject hole through which media is ejected, and including a media receipt portion on which the media ejected from the eject hole is mounted and an opening portion through which the media on the media receipt portion can be withdrawn by a user;
   a door for opening/closing the opening portion by a door moving device; and
   a media guiding portion installed on the eject hole for guiding the media to be ejected on the media receipt portion as facing the opening portion, wherein the media guiding portion comprises:
      a pair of first and second convey rotating shafts installed on the eject hole and rotated by a driving device;
      one or more pairs of conveying rollers coupled to the first and second convey rotating shafts respectively, and engaged with each other to convey the media; and
      a guiding member disposed to be parallel with the first and second convey rotating shafts and pushing a rear part of the media conveyed through the conveying rollers in proceeding direction.

14. The apparatus of claim 13, wherein the guiding member is a member having elasticity.

15. The apparatus of claim 13, wherein the media guiding portion further comprises a pushing member which is fixedly installed on the first or second convey rotating shaft for pushing the rear part of the media, which is ejected as rotating with the first or second convey rotating shaft, in the proceeding direction of the media.

16. The apparatus of claim 15, wherein the pushing member comprises a circular portion fixedly inserted in the first or second convey rotating shaft, and a plurality of protrusions protrusively formed on an outer circumferential portion of the circular portion in radial direction.

17. A media dispenser apparatus comprising:
- a casing separatably installed on a mounting portion of a media dispenser having an eject hole through which media is ejected, and including a media receipt portion on which the media ejected from the eject hole is mounted and an opening portion through which the media on the media receipt portion can be withdrawn by a user;
- a door for opening/closing the opening portion by a door moving device;
- a media guiding portion installed on the eject hole for guiding the media to be ejected on the media receipt portion as facing the opening portion;
- a media sensing unit installed on the casing for detecting whether there is the media on the media receipt portion;
- a media receipt portion rotating device for rotating the media receipt portion so that the media on the media receipt portion can be dropped into a media collecting chamber coupled to the casing without opening the door, in case that a wrong operation happens in the state that the media is on the media receipt portion, wherein both ends of the media receipt portion are installed on both side walls of the casing so as to be rotated centering around a first rotary shaft, wherein the casing seen by the user is the front surface, and wherein a pair of guide pins are installed on the both ends of the media receipt portion with a certain gap from the first rotary shaft, and the guide pins are inserted into guide slots formed on the side wall of the casing to guide the rotation of the media receipt portion by the media receipt portion rotating device, and, wherein the media receipt portion rotating device comprises:
  - a driving motor installed on of the side walls of the casing;
  - a second rotary shaft rotated by the driving motor;
  - a link member connectedly installed on the second rotary shaft and having an auxiliary slot into which the guide pin is inserted; and
  - a rotation limiting device for selectively limiting the rotation of the link member.

18. The apparatus of claim 17, wherein the rotation limiting device comprises a suspending hook extendedly formed on an end of the link member, a rotating arm rotatably installed on the side wall of the casing and having a suspending pin, on which the suspending hook is hooked, on a free end thereof, and an actuator rotating the rotating arm to release the fixation of the suspending pin on the suspending hook.

* * * * *